United States Patent [19]
Moriyasu

[11] 3,730,993
[45] May 1, 1973

[54] TRANSMISSION LINE CIRCUIT HAVING COMMON DELAY LINE FOR TWO SIGNAL PATHS OF OPPOSITE DIRECTION

[75] Inventor: Hiro Moriyasu, Portland, Oreg.

[73] Assignee: Tektronix, Inc., Beaverton, Oreg.

[22] Filed: Jan. 13, 1972

[21] Appl. No.: 217,647

Related U.S. Application Data

[63] Continuation of Ser. No. 15,567, March 2, 1970, abandoned.

[52] U.S. Cl. ....178/59, 315/27 TD
[51] Int. Cl. ....H04l 5/14
[58] Field of Search ....178/58, 59, 60; 307/263; 178/73; 343/175, 176, 180, 181; 315/27 TD

[56] References Cited

UNITED STATES PATENTS

| | | | |
|---|---|---|---|
| 3,168,656 | 2/1965 | Kobbe | 307/263 |
| 3,566,031 | 2/1971 | Carbone | 178/59 |
| 1,788,316 | 1/1931 | Morgenstern | 178/60 |
| 1,578,490 | 3/1926 | Weagant | 343/180 |

OTHER PUBLICATIONS

Wire Telegraphy (Signal School Pamphlet No. 5), August 1931, The Signal School, U.S. Army, Fort Monmouth, N.J. Paragraphs 34–41.

*Primary Examiner*—Kathleen H. Claffy
*Assistant Examiner*—David L. Stewart
*Attorney*—Stephen W. Blore et al.

[57] ABSTRACT

A transmission line circuit is described in which a single delay line is employed for transmitting two different signals in opposite direction therethrough to provide the same time delay in both signals with no distortion. The transmission line is terminated at both ends in its characteristic impedance by a termination resistor approximately equal to such characteristic impedance connected in series with the emitter to base junction resistance of a termination transistor connected as a common base amplifier. A signal cancellation means is connected to the emitter of each transistor to cancel the undelayed portion of the input signal transmitted through the termination resistor while enabling the delayed portion of such input signal to be transmitted through the delay line to the output at the collector of the other termination transistor and thereby preventing crosstalk between the two signals. The transmission line circuit is employed as a delay line in the vertical deflection system of a cathode ray oscilloscope.

14 Claims, 2 Drawing Figures

HIRO MORIYASU
*INVENTOR*

BY

BUCKHORN, BLORE, KLARQUIST & SPARKMAN
*ATTORNEYS*

TRANSMISSION LINE CIRCUIT HAVING COMMON DELAY LINE FOR TWO SIGNAL PATHS OF OPPOSITE DIRECTION

The present patent application is a continuation of U. S. patent application Ser. No. 15,567 filed Mar. 2, 1970, of H. Moriyasu, now abandoned.

BACKGROUND OF THE INVENTION

The subject matter of the present invention relates generally to the transmission of electrical signals in opposite directions through the same transmission line in order to provide such signals with identical time delays and, in particular, to such a transmission line circuit in which both ends of the delay line are terminated in its characteristic impedance and a signal cancellation means is connected to each termination to prevent crosstalk between the two input signals. The termination includes a termination resistor in series with the emitter to base junction resistance of a transistor connected as a common base amplifier, and the signal cancellation means includes a cancellation signal source connected through a current divider to such emitter in order to cancel the undelayed portion of the input signal transmitted through the termination resistor without canceling the delayed portion of the input signal transmitted through the delay line.

The transmission line circuit of the present invention is especially useful for providing precise time coincidence of two different electrical signals after such signals are provided with a time delay by transmission through a delay line. For example, the two signals may be the delayed vertical signals applied to the two vertical deflection systems of a dual beam type of cathode ray oscilloscope after portions of such signals are employed to trigger the horizontal sweep generators of such oscilloscope. After such triggering, the vertical signals are transmitted through delay lines to provide a time delay which enables the horizontal sweep signals to be generated and applied to the horizontal deflection plates at the same time such vertical signals are applied to the vertical deflection plates. Other uses include simultaneous data transmission in a time shared computer and other digital signal apparatus.

The transmission line circuit of the present invention is capable of delaying two signals independently without any crosstalk between signals, even though such signals are transmitted in opposite directions through the same common delay line. Previous attempts to provide such two-way signal transmission have employed frequency modulation, pulse code modulation, band pass filtering, and other complicated techniques to provide the same result as the present invention. Thus, the circuit of the present invention prevents crosstalk in a much simpler and less expensive manner than such prior art apparatus by connecting a signal cancellation circuit with a transmission line termination at each end of the delay line. The termination includes a termination resistor in series with the emitter to base junction resistance of a termination transistor, and not only terminates such line in its characteristic impedance but also provides an output signal current on the collector of the termination transistor. The transmission line termination per se is shown in U. S. Pat. No. 3,168,656 of J. R. Kobbe, issued Feb. 2, 1965, and assigned to the assignee of the present application. However, unlike the circuit of the present invention, the Kobbe patent does not disclose the transmission of two signals in opposite directions through the same delay line or the use of the signal cancellation technique employed in the present invention to prevent crosstalk between the two signals.

It is, therefore, one object of the present invention to provide an improved transmission line circuit in which two different electrical signals are transmitted in opposite directions through the same transmission line to provide such signals with the same time delay while maintaining such signals dependent and preventing crosstalk between signals.

Another object of the present invention is to provide such a transmission line circuit with a simple and inexpensive construction in which a signal cancellation means is employed to cancel the undelayed portion of the input signal transmitted through the termination resistance of the transmission line without canceling the delayed portion of the input signal transmitted through the delay line.

A further object of the present invention is to provide such a transmission line circuit in which the termination impedance at each end of the line includes a termination resistor which is substantially equal to the characteristic impedance of the line and is connected in series with the emitter to base junction of a transistor having its collector connected as an output of the circuit.

Still another object of the present invention is to provide such a termination and circuit in which the transistor is connected as a common base amplifier with its base grounded and its emitter connected to the common terminal at the output of the termination resistor and the output of the signal cancellation circuit so that only the delayed portion of the input signal is transmitted through such emitter to base junction to produce the output signal on the collector of such transistor.

BRIEF DESCRIPTION OF THE DRAWINGS

Other objects and advantages of the present invention will be apparent from the following detailed description of the preferred embodiment thereof and from the attached drawings of which.

DESCRIPTION OF THE PREFERRED EMBODIMENT

Figures 1, 2:
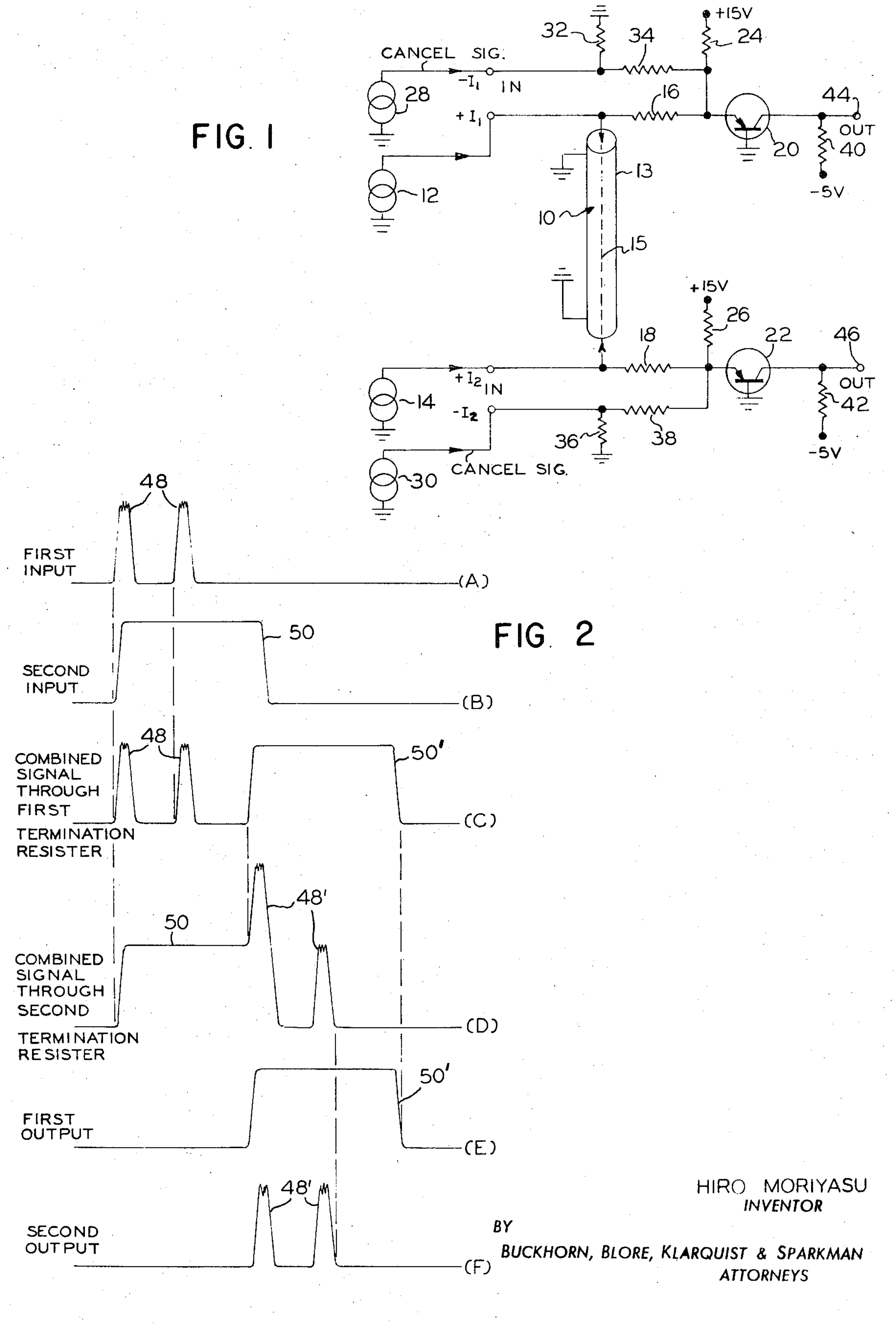
FIG. 1 is a schematic diagram of one embodiment of the transmission line circuit of the present invention.
FIG. 2 is a diagram of two electrical signals transmitted through the circuit of FIG. 1 at different positions in the circuit.

As shown in FIG. 1, the transmission line circuit of the present invention includes a common delay line 10 connected at its opposite ends to a first input signal source 12 and a second input signal source 14. The delay line may be of a strip line type or a coaxial cable having a grounded outer conductor 13 and an inner signal conductor 15 connected at one end to signal source 12 and at its other end to signal source 14. The input signal sources 12 and 14 may be current sources and transmit positive input signals $I_1$ and $I_2$ through the signal conductor 15 of the delay line in opposite directions. Both ends of the delay line are connected to transmission line terminations, each including a termination resistor 16 and 18 having a resistance approximately equal to the 50 ohms characteristic impedance of the delay line. In addition, each termination includes an output circuit formed by a termination transistor 20 and 22 having its emitter to base junction connected in series with the termination resistor and ground. The transistors 20 and 22 may be connected as grounded emitter amplifiers, but are preferably connected as grounded base amplifiers with their bases grounded, their emitters connected to the termination resistors, and their collectors connected as the signal outputs, as shown in U. S. Pat. No. 3,168,656 discussed above.

Each of the termination transistors 20 and 22 is quiescently biased in a conducting state by emitter bias resistors 24 and 26 of about 1.5 kilohms resistance connected between a source of positive D.C. supply voltage of approximately +15 volts and the emitters of such transistors when PNP type transistors are used. It should be noted that the emitter to base junction resistance of the grounded base transistors is extremely small, on the order of 5 ohms or less, and does not change appreciably with the amplitude of the input signal. Of course, the bias resistor 24 and 26 connected in parallel with such emitter junction resistance has no affect on the termination impedance due to the high value of such bias resistor and the low value of the emitter junction resistance. Thus, the termination impedance is equal to the characteristic impedance of the transmission line and thereby prevents signal reflections from the ends of such lines. As a result, the input signal current $I_1$ and $I_2$ transmitted from the signal sources 12 and 14 divides at the inputs of the delay line so that one half of each input signal current is transmitted through the delay line 16 as a delayed signal portion while the other half of such signal current is transmitted as an undelayed signal portion through the termination resistors 16 and 18.

A first cancellation signal source 28 and a second cancellation signal source 30 are connected through two pairs of current divider resistors 32, 34 and 36, 38 to the inputs of the termination output circuits at the junctions of first and second termination resistors 16 and 18 with the emitters of transistors 20 and 22, respectively. The first current divider resistors 32 and 36 are connected between ground and the outputs of the cancellation signal source 28 and 30, respectively, while the second current divider resistors 34 and 38 are connected between such outputs and the emitters of transistors 20 and 22, respectively. The first current divider resistors 32 and 36 are equal in value to the second current divider resistors 34 and 38 and may be made equal to the characteristic impedance of the delay line which, for example, is about 50 ohms. Each of the cancellation signals is a negative current signal equal in amplitude but opposite in polarity to its corresponding input signal. Thus, if the first input signal source 12 produces an input current signal of $+I_1$, the first cancellation signal source 28 produces a cancellation signal of $-I_1$. In a similar manner, when the second input signal source 12 produces an input signal of $+I_2$, then the second cancellation signal source 30 produces a cancellation signal of $-I_2$.

Because of the current divider resistors 32 and 34, one half of the first cancellation signal is transmitted to ground through resistor 32 while the other half of the cancellation signal is transmitted to the emitter of transistor 20 through resistor 34. This first cancellation signal portion $-I_1/2$ transmitted through resistor 34 cancels the undelayed portion $+I_1/2$ of the first input signal transmitted through termination resistor 16 because these two signals are of equal amplitude and opposite phase. In a similar manner, the second cancellation signal portion $-I_2/2$ transmitted through current divider resistor 38 cancels the undelayed portion $+I_2/2$ of the second input signal transmitted through termination resistor 18. As a result, only the delayed portion $+I_1/2$ of the first input signal transmitted through delay line 10 is seen as the input signal at the emitter of the second termination transistor 22. Likewise, only the delayed portion $+I_2/2$ of the second input signal transmitted through delay line 10 is seen as the input signal on the emitter of the first termination transistor 20.

The collectors of the termination transistors 20 and 22 are connected through output load resistors 40 and 42, respectively, to sources of negative D.C. supply voltage of about −5 volts. The output voltage signals produced across load resistors 40 and 42 are transmitted to output terminals 44 and 46, respectively. The output load resistors 40 and 42 may each be equal in value to the characteristic impedance of the delay line. Assuming that the common base amplifier transistors 20 and 22 have an alpha current gain of unity, the output voltage signals $V_2$ and $V_1$ produced on output terminals 44 and 46, respectively, are each equal to the input voltage signal applied to the opposite ends of the delay line.

As a result of transmitting the first and second input signals in opposite directions through the same delay line 10, each of such signals is provided with the same time delay upon reaching the output terminals 44 and 46, as shown by the waveforms of FIG. 2. In FIG. 2A, the first input signal 48 produced at the output of the first input signal source 12 is shown as a pair of narrow digital data pulses of approximately 1 volt amplitude and 10 nanoseconds pulse width. In FIG. 2B, the second input signal 58 produced at the output of the second signal source 14 is shown as a clock gate pulse having an amplitude of about 1.2 volts and a pulse width of about 80 nanoseconds. FIG. 2C shows the signals produced on the end of the delay line 10 connected to termination resistor 16, including the undelayed first input signals 48 and the delayed second input signal 50'. The delayed second input signal 50' is delayed by delay line 10 approximately 70 nanoseconds with respect to the undelayed second input signal 50 of FIG. 2B. FIG. 2D shows the signals produced on the end of the delay line connected to the second termination resistor 18, including the delayed first input signal 48' as well as the undelayed second input signal 50. It should be noted that one of the delayed first input pulses 48' is added to the top of the undelayed second input signal 50 in FIG. 2D because the time delay is only 70 nanoseconds while the width of the second input signal is 80 nanoseconds. The output signals 50' and 48' produced on output terminals 44 and 46, respectively, are shown in FIGS. 2E and 2F. These output signals do not include, in the case of FIG. 2E, the undelayed portion of the first input signal 48 or, in the case of FIG. 2F, the undelayed portion of the second input signal 50. Thus, the undelayed portion 48 of FIG. 2C is removed by the first cancellation signal transmitted through current divider resistor 34. Similarly, the undelayed portion 50 of FIG. 2D is removed by the second cancellation signal transmitted through current divider resistor 38.

Both of the delayed output signals 50′ and 48′ are provided with the same time delay of 70 nanoseconds by transmitting them in an opposite direction through the same delay line. The identical delay is achieved without producing any crosstalk between the two signals, as shown by the output signals of FIGS. 2E and 2F.

It will be obvious to those having ordinary skill in the art that many changes may be made in the details of the above-described preferred embodiment of the present invention without departing from the spirit of the invention. For example, NPN type transistors can be employed with appropriate changes in forward biasing, and the values of the current divider resistors can be different from that of the characteristic impedance if the corresponding change is made in the value of the current output of the cancellation signal sources. In view of the above, it should be understood that the scope of the present invention should only be determined by the following claims.

I claim:

1. A delay circuit provided in a cathode ray oscilloscope for delaying a pair of input signals for the same delay time, comprising:
   single delay means having a substantially uniform characteristic impedance;
   a pair of input signal sources connected to the opposite ends of said delay means;
   a pair of termination means respectively connected to each end of said delay means for terminating it in its characteristic impedance;
   a pair of output means respectively connected to each end of said delay means through said termination means for deriving an output signal transmitted through said delay means; and
   a pair of signal canceling means each applying a cancellation signal to said termination means in order to cancel undelayed input signal components directly transmitted to said output means without passing through said delay means, whereby said pair of input signals are delayed for the identical delay time over a wide frequency range without introducing any interaction in the input and output signals of said pair of input signals.

2. A delay circuit in accordance with claim 1 in which each of said pair of termination means includes a termination resistor in series with the emitter to base junction of a transistor.

3. A delay circuit in accordance with claim 2 in which the transistor is connected as a grounded base amplifier.

4. A delay circuit in accordance with claim 3 in which each amplifier has a current gain of unity and includes an output resistance equal to said characteristic impedance connected to the collector of the transistor.

5. A delay circuit in accordance with claim 3 which includes a bias means for quiescently biasing the transmission conducting and in which the delay means is a coaxial cable delay line having an inner signal conductor and an outer ground conductor.

6. A delay circuit in accordance with claim 1 in which said signal canceling means respectively include a cancellation signal source having an output current of opposite polarity as the input signal to be canceled and also a divider circuit network for adjusting the magnitude of the cancellation signal.

7. A delay circuit in accordance with claim 1 in which said delay means comprises a transmission line of substantially uniform characteristic impedance including a signal conductor and a ground conductor.

8. A delay circuit in accordance with claim 6 in which the termination means includes a grounded base amplifier transistor having its emitter connected in common to a termination resistance and to the second current divider resistor, and having its collector connected to an output resistor of a value equal to the characteristic impedance.

9. A delay circuit provided in the deflection circuit of a cathode ray tube for delaying a pair of input signals either simultaneously or separately for the same delay time, comprising:
   a transmission line having a substantially uniform characteristic impedance;
   a pair of input signal sources each producing a pair of outputs having the same amplitude but opposite polarity with one input thereof connected to the opposite ends of said transmission line;
   a pair of termination means respectively connected to the ends of said transmission line for terminating said transmission line in its characteristic impedance and having a pair of output terminals connected thereto; and
   a pair of signal cancellation means respectively receiving the other inputs of said input signal sources and connected to said termination means for canceling the undelayed input signal portions transmitted directly to the associated output terminals such that only the delayed input signal portions are transmitted to the output terminals of the opposite ends of said transmission line;
   whereby said pair of input signals are delayed identically and deriving the output thereof at the opposite ends of said transmission line.

10. A delay circuit in accordance with claim 9, wherein said transmission line is a delay line.

11. A delay circuit in accordance with claim 9, wherein said transmission line is a coaxial cable.

12. A transmission line circuit provided in a cathode ray oscilloscope for transmitting a pair of input signals;
   a single delay line having a signal conductor and a ground conductor and also a substantially uniform characteristic impedance therebetween for forming one common signal path for both of said pair of signals, said pair of signals being applied to the opposite end of said delay line;
   a pair of termination means for respectively terminating both ends of said delay line in its characteristic impedance and having a pair of output terminals, each termination means including a termination resistance connected between the end of said delay line and a base grounded transistor; and
   a pair of signal canceling means respectively connected to the outputs of said termination means for applying cancellation signals thereto in order to cancel the undelayed portions of said input signals transmitted directly thereto without passing through said delay line, said cancellation signals having the same amplitude but opposite polarity with respect to said input signals connected to the respective ends of said delay line;

whereby both signals are delayed for the same delay time by being transmitted through said delay line in the opposite direction.

13. A transmission line circuit provided in a cathode ray oscilloscope for transmitting at least two signals in opposite directions through the same transmission line to provide the signals with identical time delays and no distortion comprising:

a transmission line having a substantially uniform characteristic impedance;

first and second input means for applying first and second input signals, respectively to the opposite ends of said transmission line;

first and second termination means for respectively terminating both ends of said transmission line in its characteristic impedance and having first and second output terminals, each termination means including a termination resistance connected between the end of said transmission line and the associated output terminal; and first and second signal canceling means respectively connected to the outputs of the first and second termination resistances for applying first and second cancellation signals to the first and second termination means, respectively, with opposite polarity to and the same amplitude as that of the first and second input signals in order to completely cancel the undelayed portion of the first input signal transmitted through the first termination resistance and to cancel the undelayed portion of the second input signal transmitted through the second termination resistance so that only the delayed portion of the first input signal is transmitted to the output terminal of the second termination and only the delayed portion of the second input signal is transmitted to the output terminal of the first termination.

14. A transmission line circuit provided in the vertical deflection system of an oscilloscope for transmitting either one or both of two vertical input signals in opposite directions through a single transmission line with identical time delays determined by said transmission line without any distortion, comprising:

a transmission line having a substantially uniform characteristic impedance;

a pair of input signal sources connected respectively to the opposite ends of said transmission line;

a pair of termination means respectively connected to the ends of the transmission line for terminating said transmission line in its characteristic impedance and having a pair of output terminals connected thereto; and a pair of signal cancellation means each connected to said termination means for applying a cancellation signal having the opposite polarity to and the same amplitude as the undelayed input signal portion transmitted directly to its associated output terminal in order to completely cancel said undelayed signal portion and cause only the delayed input signal portion transmitted from the other end of said transmission line to be transmitted to said output terminal.

* * * * *